Figure 1:
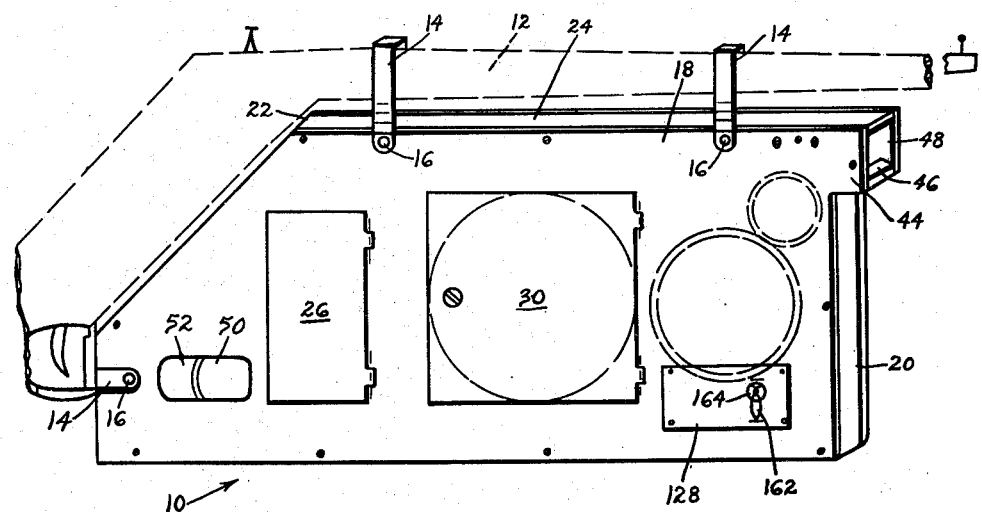

June 3, 1958        E. R. DU BOIS        2,836,919

SMALL WEAPONS NOISE SIMULATOR

Filed Sept. 28, 1954        4 Sheets-Sheet 1

INVENTOR
EDWIN R. DUBOIS

BY

ATTORNEYS

June 3, 1958

E. R. DU BOIS 2,836,919

SMALL WEAPONS NOISE SIMULATOR

Filed Sept. 28, 1954

4 Sheets-Sheet 2

INVENTOR
EDWIN R. DU BOIS

BY

ATTORNEYS

June 3, 1958  E. R. DU BOIS  2,836,919
SMALL WEAPONS NOISE SIMULATOR
Filed Sept. 28, 1954  4 Sheets-Sheet 3

INVENTOR
EDWIN R. DU BOIS
BY
ATTORNEYS

June 3, 1958 E. R. DU BOIS 2,836,919
SMALL WEAPONS NOISE SIMULATOR
Filed Sept. 28, 1954 4 Sheets-Sheet 4
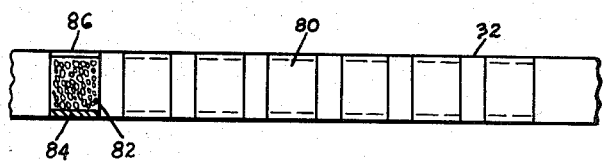
Fig. 4
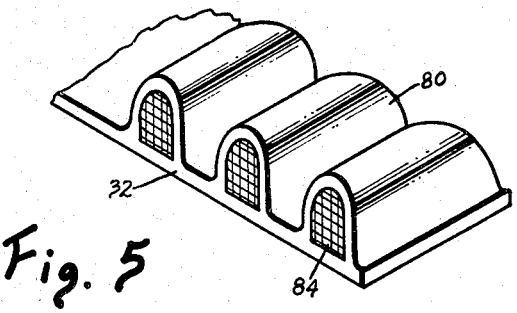
Fig. 5
Fig. 6
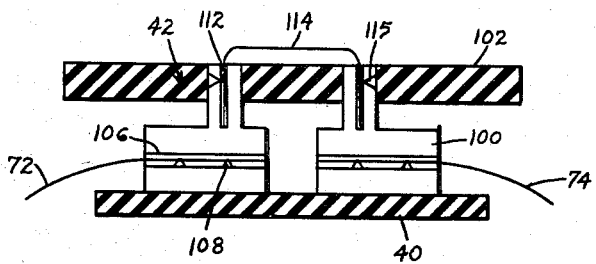
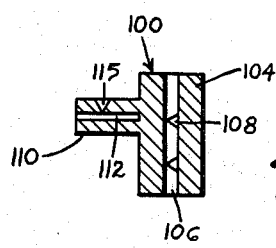
Fig. 7
INVENTOR
EDWIN R. DU BOIS
BY
ATTORNEYS

United States Patent Office 2,836,919
Patented June 3, 1958

2,836,919
SMALL WEAPONS NOISE SIMULATOR
Edwin R. du Bois, Glen Head, N. Y.

Application September 28, 1954, Serial No. 458,998

18 Claims. (Cl. 42—57)

(Granted under Title 35, U. S. Code (1952), sec. 266)

The invention described herein may be manufactured and used by or for the Government of the United States of America for governmental purposes without the payment of any royalties thereon or therefor.

The invention relates to noise simulators and particularly to means duplicating the noise of weapons of different types, such as rifles or machine guns, when a round of ammunition is exploded.

In the mass training of men for the armed forces, guard units, and the like, it is necessary to provide training means which will closely simulate realistic conditions of combat. Either live ammunition or blanks are used. This is expensive, and with inexperienced trainees, may be dangerous. However, it is necessary to provide some form of training which will make the trainees familiar with the firing sound of certain weapons. To reduce the cost of training and at the same time closely simulate combat conditions, the small weapons noise simulator of the invention has been devised.

The primary object of the invention is to simulate the noise produced when guns loaded with live ammunition are fired.

Another important object of the invention is to train personnel to recognize the sound produced by the different small arms when fired without using actual live ammunition.

Another object of the invention is to train personnel in arms sound recognition without danger of injury to the individual or others, occasioned by accidental or improper discharge of the weapon. This is carried out by the use of explosive charges which are capable of simulating the sound of actual gun fire.

Still another object of the invention is to provide an inexpensive mechanism and ammunition attachable to the actual weapon to provide realistic training and eliminate the maintenance of the weapon itself.

Another object of the invention is to provide means to detonate the explosive charge without necessitating attaching fuze wires for each charge. In this manner, the use of an imbedded squib in the propelling charge moving into the firing chamber, is avoided to reduce substantially the cost of ammunition.

And yet another object of the invention is to enable the device to be used to simulate either single or automatic gun fire.

Another object of the invention is to provide resonance producing means which will aid in simulating the noise produced by an actual weapon and also acts to relieve the pressure built up during the discharge.

Still another object of the invention is to provide means for ejection of the spent explosive power unit charge and simultaneously bring another charge into position.

A feature of the invention resides in the use of strip ammunition containing explosive powder provided with a match head igniting mixture applied by a coating process.

Another feature of the invention provides a plastic igniter fuze containing a nichrome wire igniter which contacts the explosive charge as it passes to explode it for the simulation of actual firing.

Still another feature of the invention resides in the use of a trigger having electrical circuit closing connections with the igniter fuze, and at the same time, operation of the trigger controls the movement of the next round of ammunition into the firing chamber.

Figures 8, 9:
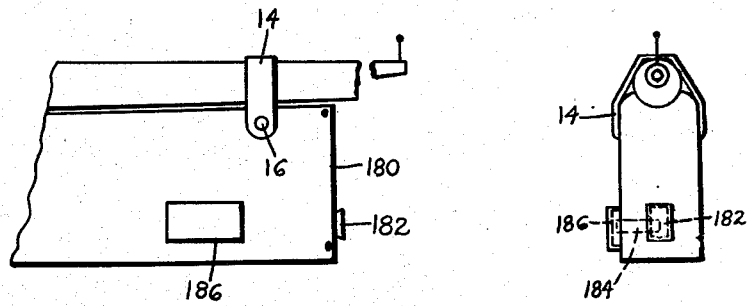
Figure 2:
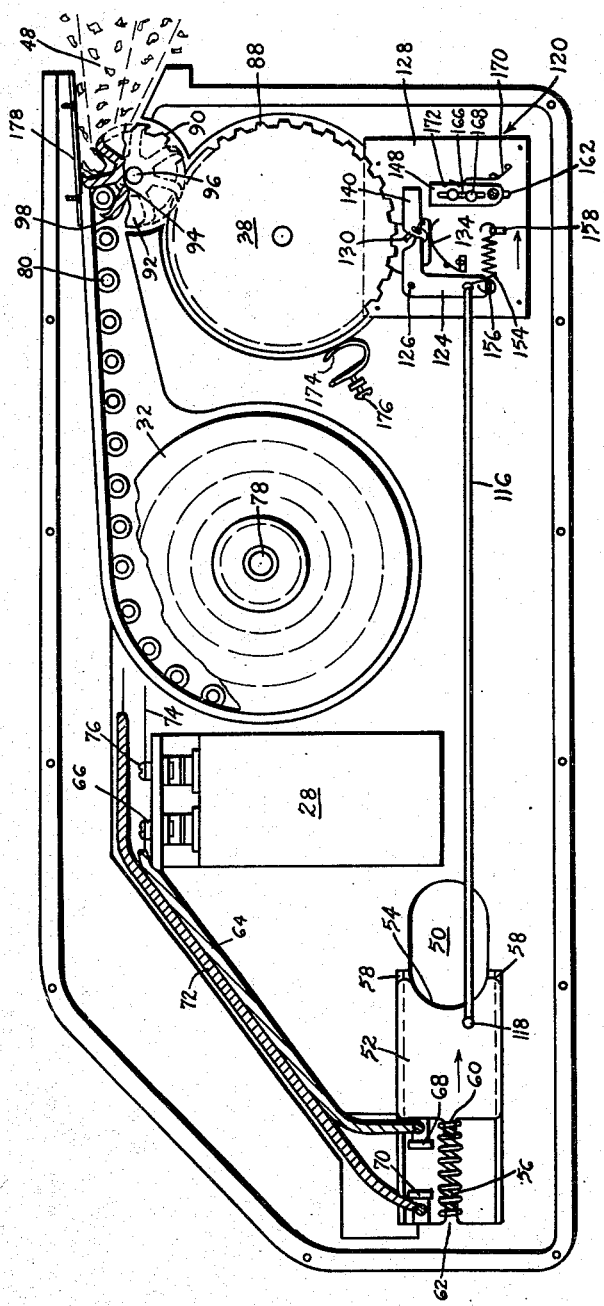
Figure 3:
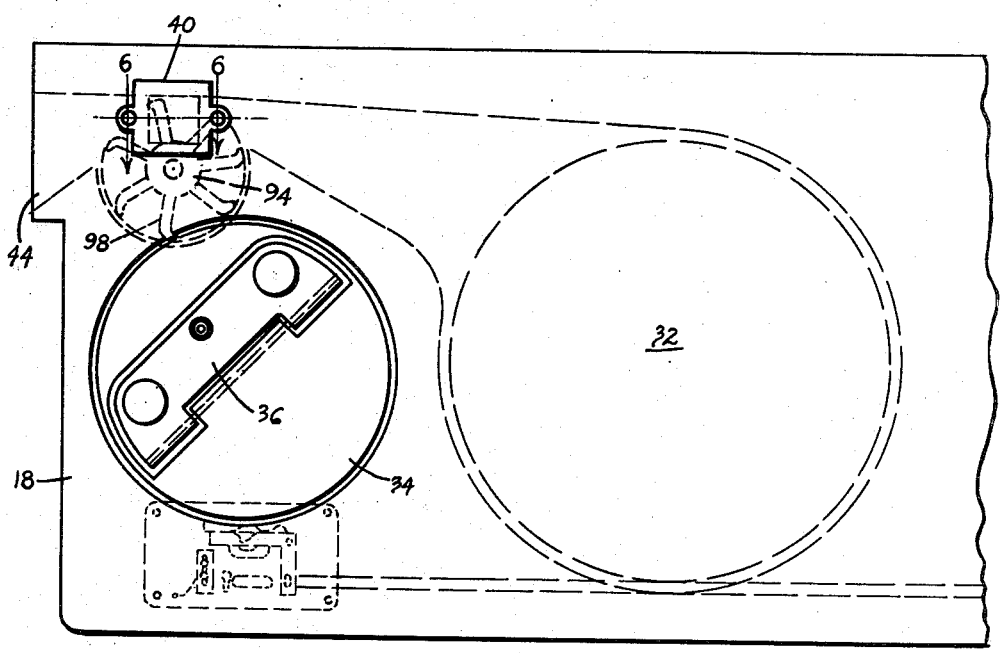
Figure 10:
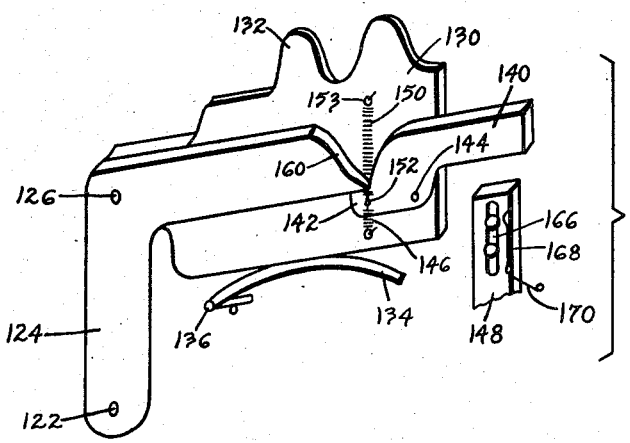

Other objects and many of the attendant advantages of this invention will be readily appreciated as the same becomes better understood by reference to the following detailed description when considered in connection with the accompanying drawings wherein:

Fig. 1 is a perspective view of the small weapons noise simulator with the attachment to a conventional gun shown in silhouette, Fig. 2 is an elevation of the simulator with the cover plate removed and illustrating the interior construction thereof, Fig. 3 is an elevation of a portion of the other side of the simulator, Fig. 4 is a plan view of an ammunition strip, Fig. 5 is a perspective view of a part of the ammunition strip shown in Fig. 4, Fig. 6 is a detail of the igniter for the ammunition charge and is taken substantially on line 6—6 of Fig. 3, Fig. 7 is an enlarged detail of the ferrule for holding the wire leads, Fig. 8 is a front elevation of a modified small arms noise simulator, Fig. 9 is an end view of the simulator of Fig. 8, and Fig. 10 is a perspective detail of the ammunition operating means.

The invention is designed to be attached to small arms weapons and is operated in close simulation of the standard weapon in order to attain the maximum training effect. As is illustrated in the figures, and particularly in Figure 1, the simulator device is designated generally at 10 and is removably attached to a rifle 12 by straps 14. Straps 14 may be of any desired construction and are secured at their ends to the simulator at 16. Simulator 10 comprises a casing having side plates 18, a front end plate 20, rear end plate 22 and top and bottom plates 24. End plate 22 and top plate 24 are shaped to conform to the shape of the rifle, thereby reducing bulk and cumbersomeness. Plate 18 is provided with a hinged cover 26 which can be swung open for entry into the interior of the casing. This provides access to storage battery 28 used to provide the power necessary in operating the device, as shall soon be made clear. A second hinged cover 30, mounted in a manner similar to cover 26, is designed to enable the operator to gain access to the interior thereof for loading an ammunition charge strip 32, to be used in training. A winding key 34, operable at 36, is provided on the opposed plate 18 (see Fig. 3), to wind a spring mounted ammunition feed gear 38. A retaining plate 40 mounting wire igniter 42, is secured adjacent the upper forward end of the casing.

Side plates 18 have forwardly extending flanges 44 extending a short distance forwardly of the upper edges thereof. End plate 20 extends up towards the bottom edge of flanges 44, and terminates in a horizontal lip member 46. Flanges 44, lip 46 and a forward extension of upper plate member 24 together form a combined firing and noise resonance chamber 48. The forward and upper position of chamber 48 adjacent the barrel of the rifle provides close simulation of the firing of a standard small arms weapon.

A trigger opening 50 enables a slidable trigger 52 to be actuated by the finger of the trainee and is the means by which the device is operated. Trigger 52 is grooved at 54 for engagement by the finger of the trainee and is slidable against the tension of spring 56. Trigger 52 slides in tracks 58 provided in the casing and includes a stud 60 in axial alignment with stud 62 on the casing. Compression spring 56 is seated on the stud members and urges trigger 52 forwardly into the inoperative position.

A wire lead 64 connects to terminal 66 on storage battery 28 and to contact 68 extending from trigger 52. Contact 70 is fixed on casing 10 in axial alignment with contact 68 and is provided with lead wire 72 connected to igniter fuze 42. It is apparent that when trigger 52 is slid back against the force of spring 56, contacts 68 and 70 will close the circuit to heat igniter fuze 42. This in turn will explode the charge in the firing chamber, as will presently be explained. Lead wire 74, connecting the igniter fuze with the other terminal 76 of power means 28 completes the circuit. If desired, contact 60 could be positioned adjacent contact 62 on the casing, and when the trigger is moved across both contacts, the circuit will be closed to heat the wire in the firing chamber. Suitable insulation will be provided to protect the operator.

A strip 32 of unit charges, preferably in roll form, is mounted on a reel retained for rotation on transverse shaft 78 journaled in the casing. While any suitable mounting means may be used, the reel is generally preferred because it prevents excess friction and provides even firing by virtue of the smooth unwinding action. Ammunition strip 32 is provided with uniformly spaced rounds of ammunition in the form of cartridge blanks 80. As is clearly illustrated in Figs. 4 and 5, cartridges or charges 80 are composed of wax impregnated paper or cloth composition and are filled with powder 82 and have one end sealed by dipping in a coating material 84. The other end is provided with a coating of a match head igniting mixture 86.

Each charge is fed consecutively into firing chamber 48 by the action of gear teeth 88 on spur gear 38 meshing with pinion teeth 90 on a pinion gear 92 mounted on shaft 96. Pinion gear 92 is actuated by spur gear 38 to rotate one step at a time. This enables ammunition receiving wheel 94, similarly mounted on pinion shaft 96, to position a round of ammunition between teeth 98 extending radially in a manner similar to spokes on a water wheel, the space between each pair of spokes housing the round to be fired.

Cartridge 80 is adapted to be carried forward by teeth 98 to place the next round in position in the firing chamber after the preceding round has been exploded by movement of trigger 52. The charge is exploded by means of wire igniter fuze 42 (see Figs. 3, 6 and 7) mounted on casing 10 by means of plate 40. Plate 40 is of non-conductive material and secures ferrules 100 held in insulated bar 102 which is in close proximity to the igniting mixture 84.

Ferrule 100 comprises a short rod or head section 104 having an axial passage 106 extending therethrough and may be of hard copper or some similar conducting material. Crimp means 108 extend into passage 106 to retain the ends of the lead wires. A stem 110 extends laterally from rod 104 and is provided with a slot 112 to receive the ends of Nichrome wire 114. Crimp means 115 hold the wire in place. As will be seen from Figs. 6 and 7, two ferrules 100 are used, with stems 110 being press fit into suitable apertures in bar 102. Wire igniter 114 is mounted in slots 112 with the intermediate free portion in close proximity to the cartridge or charge in the firing chamber. Wire 114 is of the Nichrome wire type and is adapted to heat instantly when the electrical circuit is closed. Lead wires 72 and 74 are secured in passages 106 by crimp means 108 and when the circuit is closed by the action of trigger 52, the hot wire 114 explodes the charge in the firing chamber.

Charge 80 is positioned in the firing chamber and is exploded by the movement of trigger 52. At the same time, the next unit charge is moved into the firing chamber.

The simulator is constructed to provide either single shot firing or semi-automatic firing of the cartridges. An elongated rod 116 is secured to a pin 118 on trigger 50 and extends to a step feed mechanism 120. Member 120 is in operative engagement with unit charge feed gear 38 (see Fig. 2 and 10.) Trigger rod 116 is secured at its other end at 122 to a bell-crank lever 124 pivotally held at 126 to a plate 128. A cam plate 130, with teeth 132 cooperatively engaging spur gear 28 is adjacent and pivotally movable relative to lever 124 and pivots about the same pin 126. Thus, when lever 124 is pivoted in a clockwise direction, cam 130 moves downwardly with it and teeth 132 move away from engagement with the feed gear, permitting the wound spring to rotate gear 38. A flat leaf spring 134, fixed at one and at 136, is in engagement with the bottom of cam 130, constantly urging the cam into locking position. A dog latch 140, with a tongue 142 is pivotally mounted at 144 on one end of cam 130 and is maintained under tension by means of two coil springs 146 and 150. The coil springs are of equal and opposed tension and are fixed at 152 to the dog latch substantially adjacent to tongue 142 and on cam 130 at 153. Tension springs 146 and 150 are so constructed and mounted that they will normally hold dog latch 140 in the position illustrated in Figure 10 when cam 130 is in locked position. As cam 130 is moved away from gear 38, dog 140 moves with it until the extended rear end thereof contacts an adjustable stop 148. When stop 148 is in the single shot position illustrated in Fig. 2, continuation of downward movement of cam 130 causes dog 140 to pivot about pin 144 to disengage from lever 124, thereby allowing cam plate 130 to return for engagement with the next successive gear teeth. It is only after dog 140 seats on stop bar 148, that continued clockwise rotation of lever 124 causes the dog to pivot counter-clockwise, thereby compressing spring 146 and expanding spring 150. As soon as the beveled end 160 of bell-crank lever 124 pivots free of engagement with latch tongue 142, leaf spring 134 returns cam 130 into seating position in the next successive notch of ammunition strip feed gear 38. Latch 140 is rotated clockwise to a position of equilibrium by means of springs 146 and 150.

When trigger 52 is released, a coil spring 154, secured at the bottom of bell-crank lever 124 at 156 and to the plate at 158, returns lever 124 to the position shown in Fig. 2. The beveled end 160 of lever 124 rides up the curved surface 142 of latch 140 in counter-clockwise rotation, thereby causing dog latch 140 to rotate in a clockwise direction, to compress spring 150 while spring 146 expands. This motion continues until lever 124 moves past tongue 142, thereby allowing latch 140 to return to the balanced position of Fig. 2, lever 124 now being retained on top of tongue 142 in locked position. In addition to this function, spring 154 and spring 156 take up any play in the movement of the trigger rod.

The small arms gun noise simulator is capable of being operated as an automatic weapon as well. As is illustrated in Figs. 1 and 2, an elongated slot 162 on mounting plate 128 receives an adjustment button 164 extending therethrough and this button is threaded into stop plate 148. An elongated slot 166 in plate 148 permits the plate to slide vertically on guides 168 so that spring detent 170 engages in either of two recesses 172. When stop 148 is in the up position, dog latch 140 seats thereon to return cam 130 to gear 38 after a single round has been fired. When stop plate 148 is down in the "automatic" position, pivoting of bell-crank lever 124 will now allow latch 140 to move with the cam plate 130 clear of stop 148, allowing cartridge strip 32 to be fed continuously through the firing chamber by means of spring wound member 38, until the trigger is released.

A brake 174, is adjustably mounted at 176 to prevent feed gear 38 from rotating too rapidly.

Obviously, brake 174 may be eliminated, if unnecessary. Also, if desired, an external source of power may be used and may provide lead wires having terminals on the casing connected to the Nichrome wire for igniting charges. In this case, battery 28 is eliminated and the device is somewhat more compact in design.

Since the device is preferably made of plastic or similar material, a protective plate 178 is provided in the firing and resonance chamber 48 to prevent heat given off from injuring the structure.

In some instances, it may be more desirable to provide separate resonance and discharge means. The modification illustrated in Figs. 8 and 9 discloses one such form. Casing 180 is provided with a spent cartridge discharge outlet 182 communicating with the cartridge strip and is provided with a passage 184 connecting with a noise resonance chamber 186 at the side of the casing. In this manner, the possibility of the sound being muffled is reduced to a minimum.

The operation of the small arms noise simulator is readily apparent from the above description. An ammunition cartridge strip 32 is mounted on reel shaft 78 and is fed through firing chamber 48. Spring wound feed gear 38 is operative with ammunition feed wheel 94 to bring successive rounds of ammunition into firing position.

When trigger 52 is pulled back, contacts 68 and 70 engage to close the circuit, causing Nichrome wire 114 to become heated and explode the charge. This movement of the trigger also pivots bell-crank lever 124 about fulcrum 126, moving cam 130 downwardly free of ammunition feed gear 38, and allowing the gear to rotate to move the next round into firing position. When stop 148 is in the single shot position, dog latch 140 stops on plate 148 while lever 124 pivots free. Cam 130 is now returned to locking engagement with gear 38 by leaf spring 134. When stop 148 is down in the automatic position, dog latch 140 now cannot engage stop 148 and the simulator acts as a semi-automatic weapon, continuing to fire until the trigger is released. By placing the resonance chamber 48 at the upper, forward end of the simulator, the exploded rounds are promptly ejected, and because of the box-like shape, the sound produced in the firing of the round is clear and loud. In the alternate form illustrated in Figs. 8 and 9, the round is fired somewhat further back in the casing. As a result, gases produced are conveniently discharged into the adjoining resonance chamber 186, while the spent round is eliminated through outlet 182.

Obviously many modifications and variations of the present invention are possible in the light of the above teachings. It is therefore to be understood that within the scope of the appended claims the invention may be practiced otherwise than as specifically described.

What is claimed is:

1. A small weapons noise simulator comprising a casing, a firing and resonance chamber at one end of said casing, an ammunition strip mounted in said casing and feeding into said firing chamber, means to feed the strip into the chamber, a spring wound gear means mounted in said casing and engaging the feed means, a step feed member releasably holding said feeding means, heating means on said casing adjacent said firing chamber, a trigger operatively connected to said step feed member, and electrical means connected to said trigger and to said heating means to activate said heating means and explode the ammunition round when the trigger is actuated.

2. In a small weapons noise simulator, a casing, a strip of ammunition mounted therein, said casing having a firing chamber receiving said ammunition strip, means to fire a round of ammunition, means to feed said ammunition strip in successive steps, a trigger connected to said feeding means, electrical means connected to said trigger and to said firing means and tension means urging the trigger into inoperative position, said firing means comprising a wire igniter extending into said firing chamber adjacent a round of ammunition and means to retain said wire igniter in said firing chamber.

3. In a small weapons noise simulator, a casing, a strip of ammunition mounted therein, said casing having a firing chamber receiving said ammunition strip, means to fire a round of ammunition, means to feed said ammunition strip in successive steps, a trigger connected to said feeding means, electrical means connected to said trigger and to said firing means and tension means urging the trigger into inoperative position, said firing means comprising a wire igniter extending into said firing chamber adjacent a round of ammunition, a connecting ferrule secured to said casing to retain the wire igniter in said firing chamber, and means on said ferrule to house said wire igniter.

4. The combination of claim 3, wherein said ferrule consists of a head section and a stem section, a passageway in said head section to receive an electric wire, and a slot in said stem section to receive one end of said wire igniter.

5. A small weapons noise simulator, comprising a casing, a combined firing and resonance chamber at one end of said casing, means in said casing to feed an ammunition charge into said chamber, means to explode said ammunition charge, a trigger in said casing and operatively connected to said ammunition charge exploding means, a cam releasably engaging said ammunition feeding means, lever means for moving said cam, spring means urging said cam into engagement with said ammunition feeding means, and means connected to said trigger and lever whereby movement of the trigger moves said cam out of engagement with said ammunition feeding means.

6. A small weapons noise simulator, comprising a casing, a combined firing and resonance chamber at one end of said casing, gear means in said casing, an ammunition feed wheel in said firing chamber driven by said gear means, a trigger slidably mounted in said casing, a cam releasably engaging said ammunition feeding means, means to release said cam from engagement with the ammunition feeding means, and a rod connecting said cam resisting means to said trigger whereby movement of the trigger causes the cam to release the ammunition feeding means for rotation.

7. A small weapons noise simulator, comprising a casing, a combined firing and resonance chamber at one end of said casing, gear means in said casing, an ammunition feed wheel in said firing chamber driven by said gear means, a trigger slidably mounted in said casing, a cam releasably engaging said ammunition feeding means, a bell-crank lever pivotally secured to said cam, means to hold said bell-crank lever in releasable engagement with said cam, stop means to release said holding means and a rod connecting said lever and trigger whereby movement of the trigger causes the cam to release the ammunition feeding means.

8. The combination of claim 7 wherein said stop means comprises an adjustable bar and detent means engaging said bar to retain it in any one of a plurality of selected positions.

9. The combination of claim 8 wherein said bell-crank lever holding means comprises a dog latch pivotally mounted on said cam, said latch including a tongue portion engaging said lever and an extension portion adapted to engage said stop means to pivot the latch out of engagement with the lever.

10. A small weapons noise simulator, comprising a casing, a resonance chamber in said casing, means to feed an explosive round through said resonance chamber, a heating means in said resonance chamber adapted to explode the round, and trigger means slidably mounted in said casing simultaneously actuating said round feed means and said heating means to feed and explode the change in the resonance chamber.

11. A small weapons noise simulator, comprising a casing, a resonance chamber in said casing, means to feed an explosive round through said resonance chamber, a heating means in said resonance chamber adapted to explode the round, and trigger means slidably mounted in said casing simultaneously actuating said round feed means and said heating means to feed and explode the charge in the resonance chamber, said heating means comprising a hot ignition wire extending into said resonance chamber and adapted to engage and ignite the explosive round as it passes through the chamber.

12. A small weapons noise simulator comprising a casing, a resonance chamber in said casing, an explosive round feed reel in said casing, a strip of unit rounds on said feed reel, an igniting mixture on said unit rounds, heating means extending into said resonance chamber and adapted to engage said igniting mixture, and trigger means slidably mounted in said casing simultaneously actuating said heating means and feeding the strip of unit rounds into said resonance chamber and into engagement with said heating means.

13. A small weapons noise simulator adapted to simultaneously fire and advance the next round of ammunition comprising a casing having a combined resonance and firing chamber, electrical igniting means mounted in said casing adjacent a firing chamber, means feeding a round of ammunition in said casing and across said electrical igniting means, means engaging said feed means for advancing said round of ammunition, a trigger member slidably mounted in said casing, means connecting said trigger and said ammunition round advancing means, and electrical means connected to said trigger and said igniting means, whereby actuation of the trigger simultaneously heats the igniting means and advances a round of ammunition into igniting position.

14. The combination of claim 13, wherein said electrical igniting means comprises a wire igniter, a connecting ferrule secured to said casing and retaining said wire igniter in said firing chamber and means on said ferrule housing said wire igniter.

15. The combination of claim 14 wherein said ferrule consists of a head section and a stem section, a passageway in said head section to receive an electric wire, and a slot in said stem section to receive one end of said wire igniter.

16. The combination of claim 15, wherein the means to advance the round of ammunition comprises gear means, a cam releasably engaging said gear means, a bell-crank lever pivotally secured to said cam, means holding said bell-crank lever in releasable engagement with said cam, stop means to release said holding means and a rod connecting said lever and trigger whereby movement of the trigger causes the cam to release the gear means.

17. The combination of claim 16, wherein said stop means comprises an adjustable bar and detent means engaging said bar to retain it in any one of a plurality of selected positions.

18. The combination of claim 17, wherein said bell-crank lever holding means comprises a dog latch pivotally mounted on said cam, said latch including a tongue portion engaging said lever and an extension portion adapted to engage said stop means to pivot the latch out of engagement with the lever.

References Cited in the file of this patent

UNITED STATES PATENTS

| | | |
|---|---|---|
| 1,468,822 | Ludorf | Sept. 25, 1923 |
| 1,598,784 | Rae et al. | Sept. 7, 1926 |
| 2,045,369 | Rickenbacher | June 23, 1936 |
| 2,061,471 | Larson | Nov. 17, 1936 |
| 2,313,030 | Tauschek | Mar. 2, 1943 |
| 2,507,805 | Milne | May 16, 1950 |
| 2,643,476 | Kilgore | June 30, 1953 |

FOREIGN PATENTS

| | | |
|---|---|---|
| 158,172 | Great Britain | Feb. 3, 1921 |
| 622,784 | Germany | Dec. 6, 1935 |